(12) United States Patent
Ueno et al.

(10) Patent No.: US 8,621,262 B2
(45) Date of Patent: Dec. 31, 2013

(54) SEMICONDUCTOR INTEGRATED CIRCUIT AND METHOD FOR CONTROLLING SEMICONDUCTOR INTEGRATED CIRCUIT

(75) Inventors: Shigeyuki Ueno, Kanagawa (JP); Hiroyuki Nakajima, Kanagawa (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 0 days.

(21) Appl. No.: 13/619,403

(22) Filed: Sep. 14, 2012

(65) Prior Publication Data

US 2013/0013831 A1    Jan. 10, 2013

Related U.S. Application Data

(63) Continuation of application No. 12/232,162, filed on Sep. 11, 2008, now abandoned.

(30) Foreign Application Priority Data

Oct. 1, 2007    (JP) .................................. 2007-257258

(51) Int. Cl.
G06F 11/00    (2006.01)

(52) U.S. Cl.
USPC .................. 714/4.11; 710/110; 714/2; 714/3; 714/4.2; 714/10; 714/11; 714/13

(58) Field of Classification Search
USPC ............. 714/2, 3, 4.11, 4.2, 4.3, 5.11, 10, 11, 714/13; 710/104, 110
See application file for complete search history.

(56) References Cited

U.S. PATENT DOCUMENTS

| 5,276,823 | A |   | 1/1994 | Cutts et al. |
| 5,301,278 | A |   | 4/1994 | Bowater et al. |
| 5,508,910 | A |   | 4/1996 | Diehl |
| 5,546,535 | A |   | 8/1996 | Stallmo et al. |
| 5,644,700 | A |   | 7/1997 | Dickson et al. |
| 5,774,640 | A | * | 6/1998 | Kurio ............................. 714/4.3 |

(Continued)

FOREIGN PATENT DOCUMENTS

| JP | 2-85953 | 3/1990 |
| JP | 6-274459 | 9/1994 |
| JP | 2001-166960 | 6/2001 |
| JP | 2003-296294 | 10/2003 |

OTHER PUBLICATIONS

Hewlett Packard. HP Recommended SMART Array Rebuilding/Restoring Techniques. May 2003.*
Wunder et al. z/VM VSWITCH with failover. 2004.*

(Continued)

*Primary Examiner* — Matthew D Spittle
(74) *Attorney, Agent, or Firm* — McGinn Intellectual Property Law Group, PLLC

(57) ABSTRACT

A semiconductor integrated circuit, including a first master circuit, a second master circuit, a first slave circuit assigned to the first master circuit, and determines that an access request signal is sent from the first master circuit when an identification information is a first value, a first bus coupled to the first master circuit, the second master circuit, and the first slave circuit, a bus controller is configured to transmit the access request signal to the first slave circuit via the first bus, a system controller directs the bus controller to substitute the first value for a second value on the identification information of the access request signal received from the second master circuit when the first master circuit is in the deactivated state.

20 Claims, 7 Drawing Sheets

(56) References Cited

U.S. PATENT DOCUMENTS

| | | | |
|---|---|---|---|
| 5,790,775 A | 8/1998 | Marks et al. | |
| 5,822,512 A | 10/1998 | Goodrum et al. | |
| 5,848,230 A | 12/1998 | Walker | |
| 5,974,562 A | 10/1999 | Townsend et al. | |
| 5,975,738 A | 11/1999 | DeKoning et al. | |
| 6,052,795 A * | 4/2000 | Murotani et al. | 714/3 |
| 6,151,684 A | 11/2000 | Alexander et al. | |
| 6,256,748 B1 | 7/2001 | Pinson | |
| 6,282,584 B1 | 8/2001 | Garroussi et al. | |
| 6,529,978 B1 | 3/2003 | Eide et al. | |
| 6,578,157 B1 * | 6/2003 | Weber et al. | 714/6.13 |
| 6,578,158 B1 | 6/2003 | Deitz et al. | |
| 6,766,471 B2 * | 7/2004 | Meth | 714/16 |
| 7,003,687 B2 | 2/2006 | Matsunami et al. | |
| 7,093,043 B2 | 8/2006 | Tan et al. | |
| 7,290,170 B2 | 10/2007 | Anderson et al. | |
| 7,468,853 B2 | 12/2008 | Suzuki et al. | |
| 7,613,947 B1 | 11/2009 | Coatney et al. | |
| 7,624,336 B2 | 11/2009 | Crawford et al. | |
| 7,711,983 B2 * | 5/2010 | Hatasaki et al. | 714/13 |
| 2008/0301495 A1 | 12/2008 | Kalos et al. | |

OTHER PUBLICATIONS

Sun Microsystems. SANtricity ES Storage Manager Failover Drivers User Guide. Version 10.77. May 2011.*
United States Office Action dated Jun. 28, 2012 in U.S. Appl. No. 12/232,162.
United States Office Action dated Feb. 28, 2012 in U.S. Appl. No. 12/232,162.
United States Office Action dated Aug. 31, 2011 in U.S. Appl. No. 12/232,162.
United States Office Action dated Apr. 15, 2011 in U.S. Appl. No. 12/232,162.
United States Office Action dated Dec. 2, 2010 in U.S. Appl. No. 12/232,162.
United States Office Action dated May 12, 2010 in U.S. Appl. No. 12/232,162.
United States Office Action dated Jan. 13, 2012 in U.S. Appl. No. 12/232,162.
Japanese Office Action dated Feb. 7, 2012 (English Translation Thereof).
Kotera, et al., "The Performance Evaluation of a Way-Allocotable Shared Cache Mechanism", IPSJ SIG Technical Reports, 2007-ARC-174, Computer Architecture, Japan IPSJ, Aug. 1, 2007, vol. 2007, No. 79, pp. 31-36.
Amano, "A survey on Dynamic Reconfigurable Processors", IEICE Technical Report, Japan IEICE, Oct. 17, 2003, vol. 103, No. 380, pp. 47-52.
Sueyoshi, "Trends of Reconfigurable Hardware", IEICE Technical Report, Japan, IEICE Aug. 12, 2004, vol. 104, No. 248, pp. 31-36.
Shikano, et al., "Performance Evaluation of MPS Audio Encoder on Oscar Heterogeneous Chip Multi-Processor", ISPJ, Computing System, Japan, IPSJ, May 15, 2007, vol. 48, No. SIG8(ACS18), pp. 141-152.

* cited by examiner

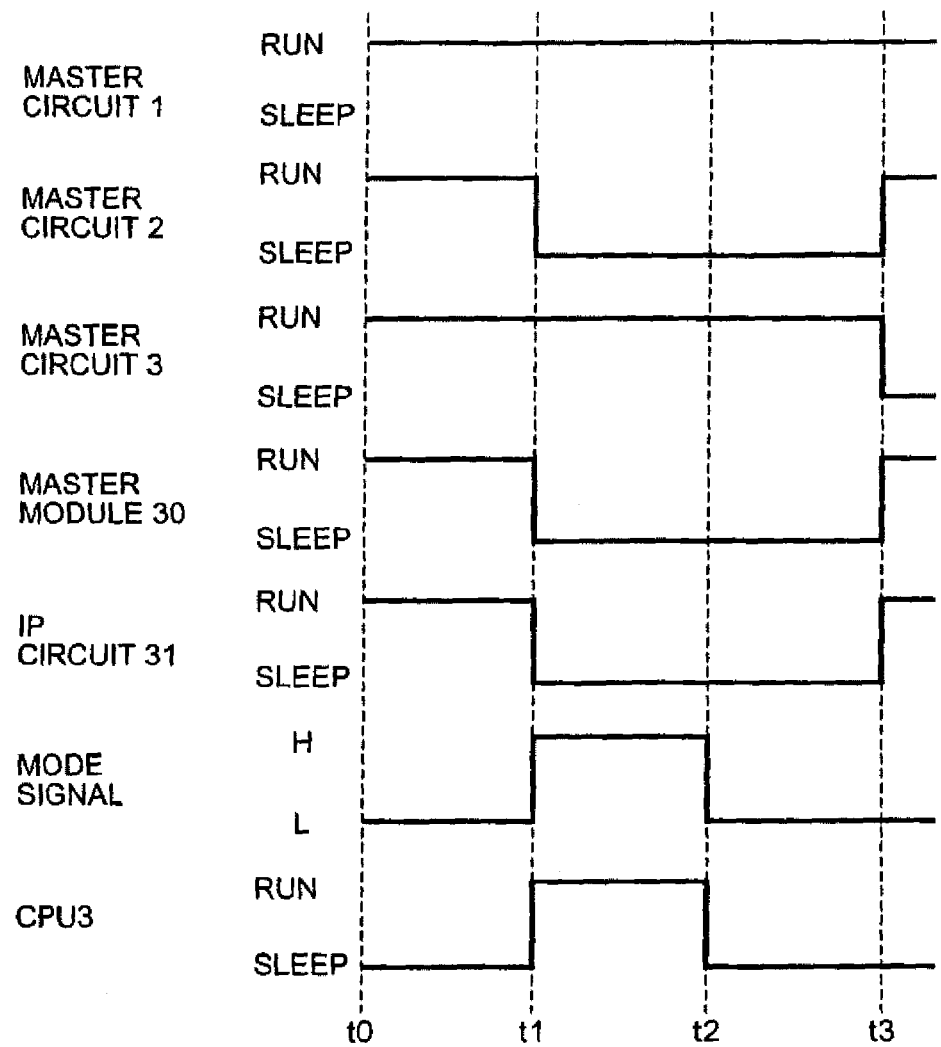

SEMICONDUCTOR INTEGRATED CIRCUIT AND METHOD FOR CONTROLLING SEMICONDUCTOR INTEGRATED CIRCUIT

CROSS REFERENCE TO RELATED APPLICATIONS

The present application is a Continuation of U.S. patent application Ser. No. 12/232,162, filed on Sep. 11, 2008, now abandoned which is based on Japanese Patent Application No. 2007-257258, filed on Oct. 1, 2007, the entire contents of which is incorporated herein by reference.

BACKGROUND OF THE INVENTION

1. Field of the Invention

The present invention relates to a semiconductor integrated circuit and a method for controlling a semiconductor integrated circuit.

2. Background Art

Semiconductor integrated circuits have been remarkably improved to be more multifunctional and highly integrated in recent years. In such a semiconductor integrated circuit, multiple functional circuits (intellectual property (IP) circuits) implementing different functions are monolithically integrated.

Multiple master circuits and multiple slave circuits are generally mounted in such a multifunctional semiconductor integrated circuit. A master circuit is a circuit that instructs other circuits to execute given processing. Examples of a master circuit include a central processing unit (CPU), a digital signal processor (DSP) and other signal-processing circuits (such as an image processing circuit). On the other hand, a slave circuit is a circuit that executes a given processing in response to an instruction issued by others. An example of a slave circuit is a semiconductor storage device (hereinafter referred to as a memory when appropriate).

Systems each including master circuits and slave circuits are disclosed in Japanese Patent Application Publication Nos. Hei 6-274459, 2003-296294, 2001-166960, and Hei 2-85953. In a technique disclosed in Japanese Patent Application Publication No. Hei 6-274459, the connection relation between processors is allowed to be changed, so that the versatility of LSI is improved. In a technique disclosed in Japanese Patent Application Publication No. 2003-296294, an input/output terminal is assigned to one of multiple function modules on the basis of profile data that indicates whether each of the function modules is used or not. In a technique disclosed in Japanese Patent Application Publication No. 2001-166960, an individual region for each processor is assigned to a shared memory. Japanese Patent Application Publication No. Hei 2-85953 discloses a technique for performing a fault analysis on a master module.

In some semiconductor integrated circuits each including master circuits and slave circuits, a given slave circuit is previously assigned to a given master circuit. In this case, the slave circuit assigned to the master circuit is unavailable when the master circuit is in an inactive state (in a shutdown state or a sleep state).

In a semiconductor integrated circuit including multiple master circuits and multiple slave circuits, the number of unavailable slave circuits increases as the number of master circuits in an inactive state increases. This may result in a significant decrease in the use efficiency of system resources. In other words, a slave circuit assigned to a certain master circuit becomes unavailable when the certain master circuit goes into an inactive state. Accordingly, the use efficiency of system recourses decreases.

SUMMARY

The semiconductor integrated circuit according to the present invention includes a first slave circuit, a first master circuit, and a second master circuit. The first slave circuit previously assigned to the first master circuit is reassigned to the second master circuit in accordance with the operational status of the first master circuit.

By reassigning the first slave circuit previously assigned to the first master circuit to the second master circuit in accordance with the operational status of the first master circuit, the first slave circuit can be used not only by the first master circuit but also by the second master circuit. Accordingly, the use efficiency of system resources is improved.

The method for controlling the semiconductor integrated circuit according to the present invention is a method for controlling a semiconductor integrated circuit having a first and a second master circuits and at least one slave circuit. In this method, the slave circuit previously assigned to the first master circuit is reassigned to the second circuit when the operational status of the first master circuit is detected to be in an inactive state.

By reassigning the first slave circuit previously assigned to the first master circuit to the second master circuit when the operational status of the first master circuit is inactive, the slave circuit can be used not only by the first master circuit but also by the second master circuit. Accordingly, the use efficiency of system resources of the semiconductor integrated circuit is improved.

According to the present invention, it is possible to improve the use efficiency of system resources in a semiconductor integrated circuit with master circuits and slave circuits.

BRIEF DESCRIPTION OF THE DRAWINGS

FIG. 7 is a general timing diagram illustrating the operation of the semiconductor integrated circuit 52.

DESCRIPTION OF THE PREFERRED EMBODIMENTS

Figure 1:
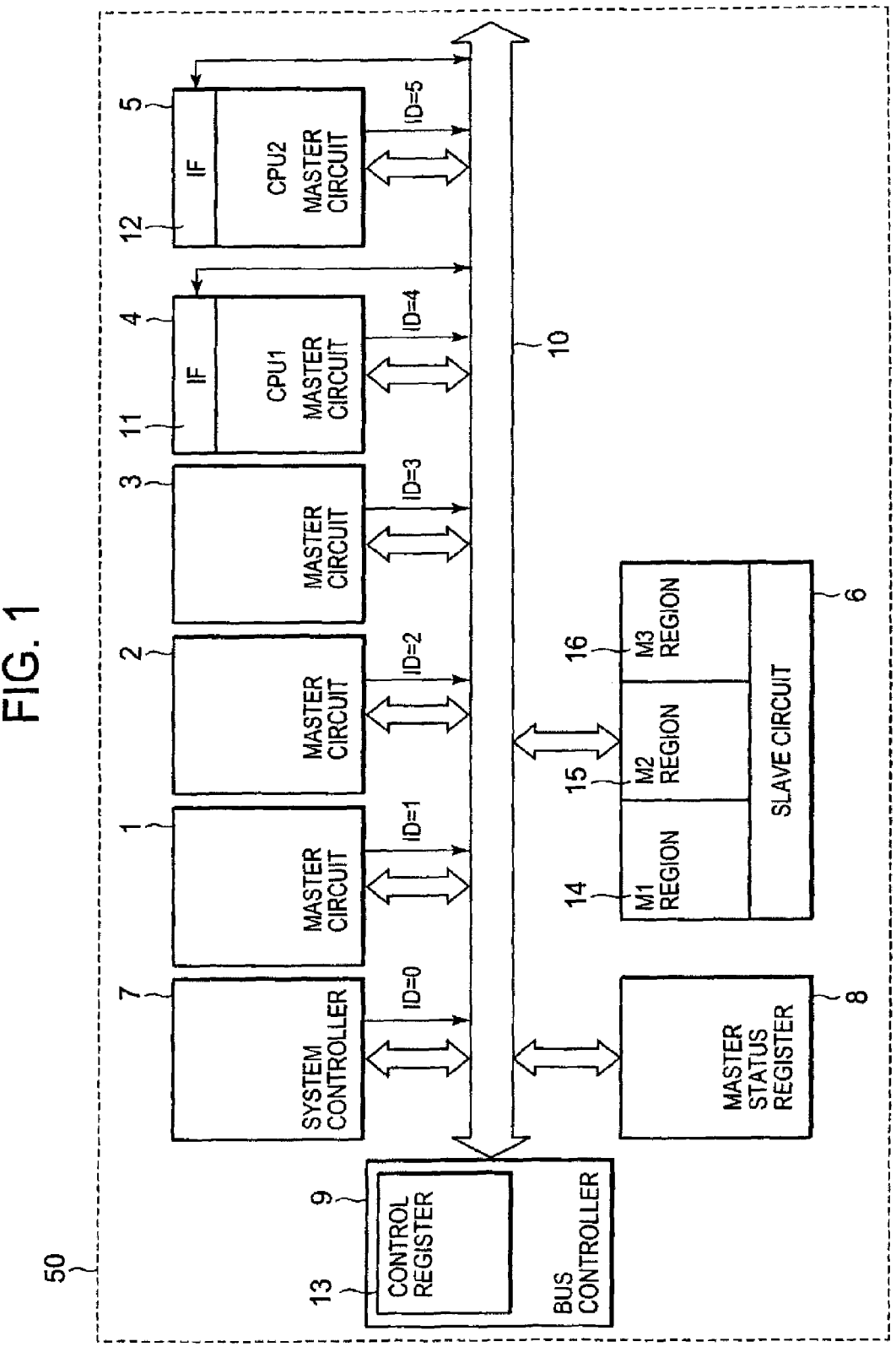
FIG. 1 is a schematic block diagram of a semiconductor integrated circuit 50.

Embodiments of the present invention are described below with reference to the accompanying drawings. Each embodiment is simplified for convenience of the description. The technical scope of the present invention should not be construed narrowly based on the simplified descriptions in the drawings. The same reference numerals are denoted to the same components, and descriptions thereof are not repeated.

First Embodiment

Figure 2:
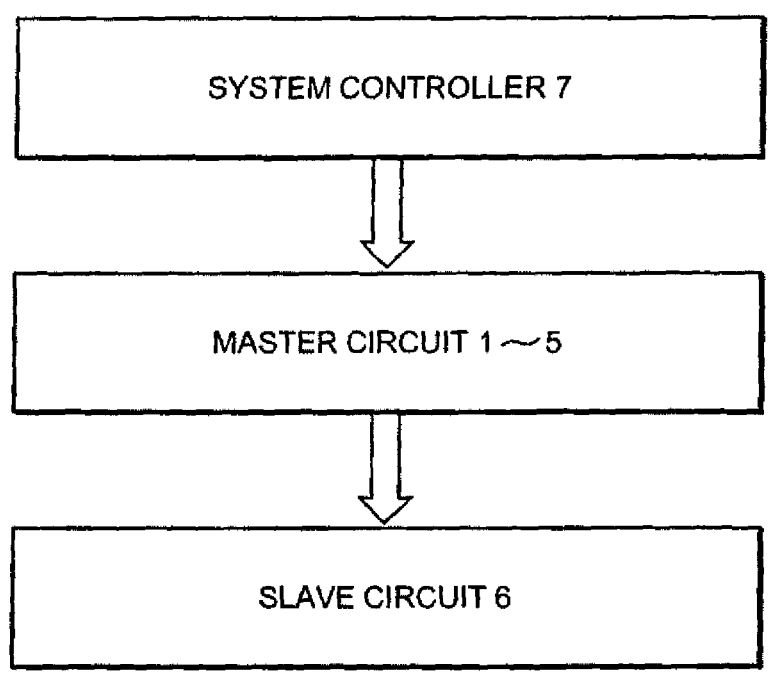
FIG. 2 is an explanatory diagram for describing the order of superiority of the circuit blocks.
Figure 3:
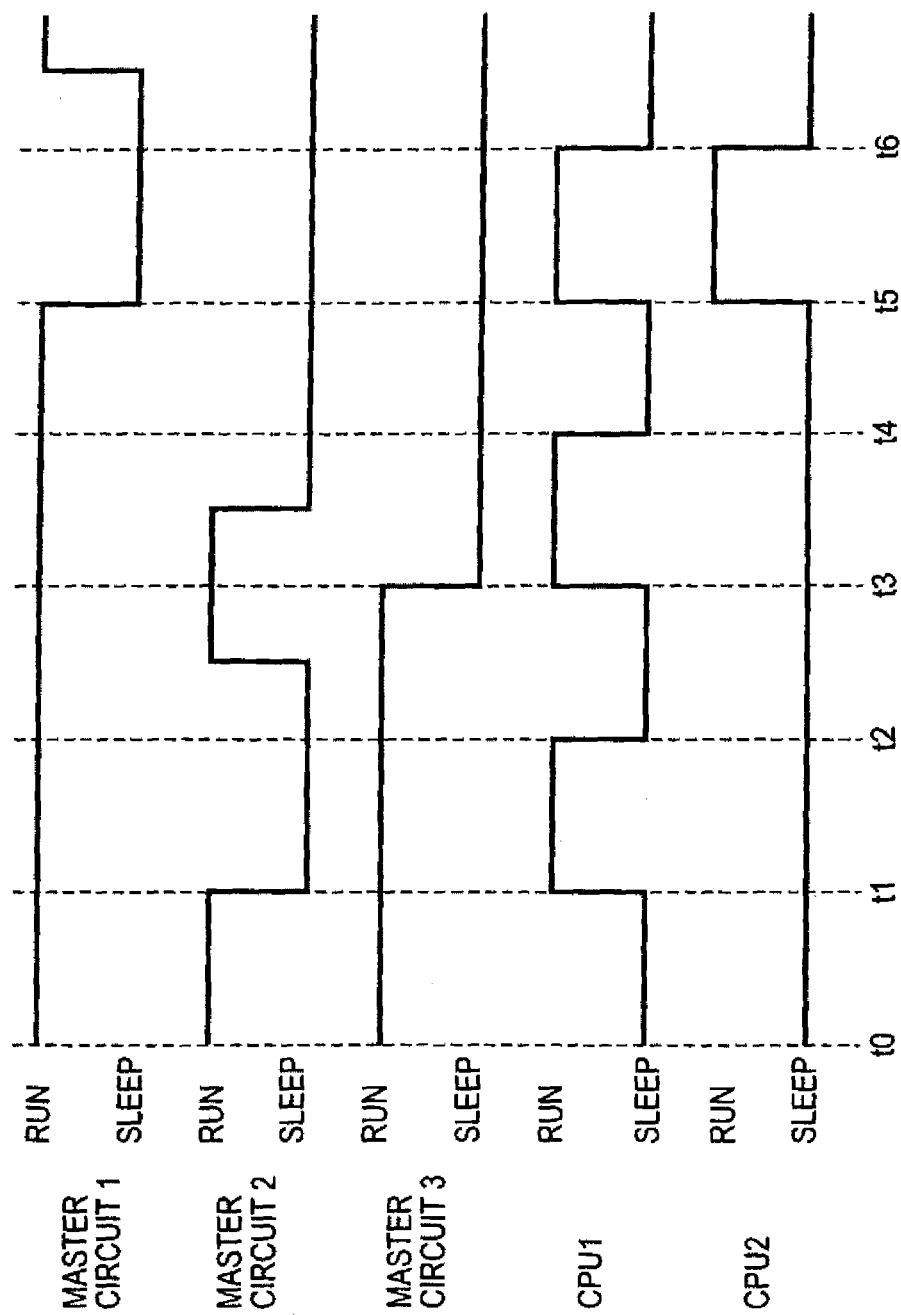
FIG. 3 is a schematic timing diagram for describing the operation of the semiconductor integrated circuit 50.

A first embodiment is described hereinafter in connection with FIGS. 1 through 3. FIG. 1 shows a schematic block diagram of a semiconductor integrated circuit 50. FIG. 2 shows an explanatory diagram for describing the order of superiority of the circuit blocks. FIG. 3 shows a schematic timing diagram for describing the operation of the semiconductor integrated circuit 50.

As shown in FIG. 1, the semiconductor integrated circuit 50 includes master circuits 1 to 5, a slave circuit 6, a system controller 7, a master status register 8, a bus controller 9 and a bus 10. The semiconductor integrated circuit 50 is a monolithic semiconductor device. The semiconductor integrated circuit 50 is made multifunctional based on SoC (System on Chip) technology.

The master circuits 1 to 5 instruct other circuits to execute a predetermined processing. The master circuits may be, for example, a CPU (Central Processing Unit), a DSP (Digital Signal Processor) or other signal-processing circuits (such as an image processing circuit).

A master ID (master identifier) is previously set for each of the master circuits 1 to 5. A master ID=1 is set for the master circuit 1, a master ID=2 for the master circuit 2, a master ID=3 for the master circuit 3, a master ID=4 for the master circuit 4, and a master ID=5 for the master circuit 5. The master circuits 1 to 5 are connected to the bus controller 9 via the bus 10.

The master circuits 4 and 5 are small-scale CPUs (miniature CPU) with a smaller circuit size than the master circuits 1 to 3. The master circuit 4 has an interface circuit (input/output circuit) 11 that is connected to the bus 10. The master circuit 5 also has an interface circuit (input/output circuit) 12 that is connected to the bus 10. The master circuit 4 may be called CPU 1 and the master circuit 5 may be called CPU 2 in the following descriptions.

The slave circuit 6 executes a predetermined processing in response to an instruction from outside. A slave circuit may be, for example, a memory. The slave circuit 6 determines which master circuit has made an access, based on its master ID. Here, the slave circuit 6 is divided into three regions. Specifically, the slave circuit 6 includes an M1 region (slave circuit) 14 as a first region, an M2 region (slave circuit) 15 as a second region, and an M3 region (slave circuit) 16 as a third region. The M1 region 14 is assigned for the master circuit 1. In other words, the M1 region 14 is a dedicated region for the master circuit 1. The slave circuit 6 determines, based on a master ID, if an access to the M1 region 14 is made by the master circuit 1. That is to say, the slave circuit 6 permits an access to the M1 region 14 if a master ID transmitted via the bus 10 is the one previously set in the master circuit 1. On the other hand, the slave circuit 6 denies an access to the M1 region 14 if the value of the master ID transmitted via the bus 10 is not the one set in the master circuit 1, but the one set in a master circuit other than the master circuit 1. Similarly, the M2 region 15 is assigned to the master circuit 2, and the M3 region 16 is assigned to the master circuit 3. The above-mentioned explanation on the access control to the M1 region 14 also applies to the M2 region 15 and to the M3 region 16. Although the slave circuit 6 is divided to form the M1 region 14, the M1 region 14 alone is assumed to work as a slave circuit. The same applies to the M2 region 15 and to the M3 region 16.

The system controller 7 is a master circuit that controls the whole system of the semiconductor integrated circuit 50. That is to say, as shown in FIG. 2, the system controller 7 is a circuit block of the most significant hierarchy that controls the master circuits 1 to 5. In addition, as shown in FIG. 2, the master circuits 1 to 5 form a circuit block of the intermediate hierarchy that controls the slave circuit 6. The slave circuit 6 is a circuit block of the lowest hierarchy that operates in response to instructions from the master circuits 1 to 5.

The system controller 7 controls each of the master circuits 1 to 5. For example, the system controller 7 not only controls start and restart of the master circuit 1 and start and end of processing by the master circuit 1, but also gives instructions to the other master circuits concurrently.

The system controller 7 is connected to the interface circuit 11 of the CPU 1. The system controller 7 is able to issue commands to the master circuit 4 via the interface circuit 11 and access the internal resources of the master circuit 4. As to the CPU 2, the system controller 7 is also able to carry out the similar operations via the interface circuit 12.

The system controller 7 checks the operation status of each of the master circuits 1 to 5 by referring to the master status register 8. The system controller 7 changes the bus setting based on the operation status of each of the master circuits 1 to 5, and reassigns a slave circuit previously assigned to a given master circuit to another master circuit.

For example, the system controller 7 reassigns the M2 region 15 previously assigned to the master circuit 2 to the CPU 1 when the master circuit 2 is in an inactive state. The M2 region 15 is utilized by the CPU 1 even when the master circuit 2 is in an inactive state, thereby improving the use efficiency of system resources of the semiconductor integrated circuit 50 as a whole.

As shown in FIG. 1, a value "0" is previously set for the system controller 7 as a master ID. The master ID=0 set for the system controller 7 is transmitted to the bus controller 9 via the bus 10.

The master data register 8 is a register having multiple bits. Each bit holds a status value that indicates the operation status of each master circuit. More specifically, a status value is set to a given bit in the master status register 8, the status value indicating if the status of the master circuit 1 is in an active state (operational state) or in an inactive state (shutdown or sleep state). For example, the master circuit 1 is in an operational state when the status value is 1 (level H); the master circuit 1 is in either a shutdown or sleep state when the status value is 0 (level L).

Note that an active state (hereinafter referred to as an operational state as needed) is a state in which a master circuit can issue a command to the other circuits to execute a certain processing. Also note that an inactive state not only includes a sleep state but also a state in which the function of the master circuits is substantially stopped, such as a shutdown state.

The bus controller 9 according to the present embodiment includes a control register 13. The bus setting is changed by changing the hold value set in the control register 13. This operation changes the master ID that is transmitted to the slave circuit, thereby enabling a signal transfer between a master circuit and a slave circuit, a combination not initially used. The bus controller 9 includes the control register 13 which is a register that includes multiple bits. A signal value is set in the control register 13, the signal value indicating a method for controlling the signal transfer between a master circuit and a slave circuit. For example, when a predetermined value is set in the control register 13, the bus controller 9 can change the bus setting in a way that an access request is processed in a slave circuit by regarding the access request, which is actually sent from the master circuit 4, as an access request sent from the master circuit 2.

The system controller 7 changes the setting of the hold value set in the above-mentioned control register 13. This changes the bus setting so that an access request is processed by regarding the access request, which is actually issued from a master circuit, as an access request issued from another master circuit. For example, as is similar to the above specific example, when the system controller 7 sets a predetermined hold value in the control register 13, the bus setting is changed, and the access request is processed by regarding the access request, which is actually issued by the master circuit 4, as an access request issued by the master circuit 2.

The bus 10 is a transmission line for signals and includes an address bus, data bus and a control line. Connected to the bus 10 are the master circuit 5 to 10, the slave circuit 6, the system controller 7, the master status register 8 and the bus controller 9.

The operation of the semiconductor integrated circuit 50 is described below with reference to FIG. 3.

At time t0, the master circuit 1 is in an operational state, the master circuit 2 is in an operational state, the master circuit 3 is in an operational state, the CPU 1 is in a sleep state, and the CPU 2 is in a sleep state. In FIG. 3, an operational state is indicated as RUN, and a sleep state is indicated as SLEEP.

At time t1, the master circuit 2 goes into a sleep state. At this time, as a status value, in the master status register 8, indicating the operation status of the master circuit 2, a value indicating that the master circuit 2 is in an inactive state is set. In response to this change of the status value, the system controller 7 changes the bus setting and reassigns the M2 region 15 previously assigned to the master circuit 2 to the CPU 1. More specifically, the system controller 7 changes the hold value in the control register 13 from a value indicating the master circuit 2 to a value indicating the CPU 1. Thereby, an access request from the CPU 1 is processed at the slave circuit 6 as an access request from the master circuit 2. That is to say, 2 is transmitted to the slave circuit 6 as a master ID, and the M2 region 15 of the slave circuit 6 is made available to the CPU 1. After changing the bus setting, the system controller 7 causes the CPU 1 go into the operational state by starting the CPU 1 and instructing the CPU 1 to start processing. At this time, as a status value, in the master status register 8, indicating the operation status of the CPU 1, a value indicating that the CPU 1 is in an active state is set.

At time t2, the CPU 1 goes into a sleep state. At this time, as a status value, in the master status register 8, indicating the operation status of the CPU 1, a value indicating that CPU 1 is in an inactive state is set. In response to this change of the status value, when detecting the end of processing performed by the CPU 1, the system controller 7 initiates the bus setting and reassigns the M2 region 15 previously assigned to the CPU 1 to the master circuit 2. More specifically, the system controller 7 puts the hold value in the control register 13 back to a value indicating the master circuit 2, which is the initial value. By this, the master ID transmitted to the slave circuit 6 is changed from 2 to 4. After this, an access request issued from the CPU 1 to the slave circuit 6 is recognized as an access request issued from the CPU 1 at the slave circuit 6; the access request will not be processed as one from the master circuit 2.

Incidentally, the state of the master circuit 2 never changes from a sleep state to an operational state between the time t1 to the time t2. This is because the system controller 7 does not start the master circuit 2 at least while the M2 region 15 is assigned to the CPU 1.

In addition, there is another method for confirming the end of processing at the CPU 1 in addition to the method in which the system controller 7 checks the status value in the master status register 8. That is, the end of processing by the CPU 1 may be detected by a way that the system controller 7 checks the operation status of the CPU 1 via the interface circuit 11. Alternatively, the end of processing by the CPU 1 may be detected by a way that the system controller 7 receives a process end notification from the CPU 1 via the bus 10.

At time t3, the master circuit 3 goes into a sleep state. At this time, as a status value, in the master status register 8, indicating the operation status of the master circuit 3, a value indicating that the master circuit 3 is in an inactive state is set. In response to the change of the status value, the system controller 7 changes the bus setting and reassigns the M3 region 16 previously assigned to the master circuit 3 to the CPU 1. This changes the master ID transmitted to the slave circuit 6 from 4 to 3. Thereby, the slave circuit 6 processes an access request from the CPU 1 as an access request from the master circuit 3. That is to say, The M3 region 16 is made available to the CPU 1. The system controller 7 puts the CPU 1 in an operational state after changing the bus setting. As a status value, in the master status register 8, indicating the operation status of the CPU 1, a value indicating that the CPU 1 is in an active state is set.

At time t4, the CPU 1 goes into a sleep state. At this time, as a status value, in the master status register 8, indicating the operation status of the CPU 1, a value indicating that the CPU 1 is in an inactive state is set. Upon detecting the end of processing by the CPU 1, the system controller 7 initiates the bus setting and reassigns the M3 region 16 previously assigned to the CPU 1 to the master circuit 3. Thereafter, the M3 region 16 does not process an access from the CPU 1 as an access from the master circuit 3.

At time t5, the master circuit 1 and the master circuit 2 are in a sleep state. At this time, as a status value, in the master status register 8, indicating the operation status of the master circuit 1, a value indicating that the master circuit 1 is in an inactive state is set. The same applies to the master circuit 2. In response to these changes of the status values, the system controller 7 initiates the bus setting and reassigns the M1 region 14 previously assigned to the master circuit 1 to the CPU 1. In the meantime, the system controller 7 initiates the bus setting and reassigns the M2 region 15 previously assigned to the master circuit 2 to the CPU 2.

Thereby, the slave circuit 6 processes an access request issued from the CPU 1 as an access request issued from the master circuit 1. Likewise, the slave circuit 6 processes an access request issued from the CPU 2 as an access request issued from the master circuit 2. That is to say, the master ID transmitted to the slave circuit 6 is changed, and the M1 region 14 of the slave circuit 6 is made available to the CPU 1. Also, the M2 region 15 of the slave circuit 6 is made available to the CPU 2. After changing the bus setting, the system controller 7 puts the CPU 1 and CPU 2 in an active state. As a status value, in the master status register 8, indicating the operation status of the CPU 1, a value indicating that the CPU 1 is in an active state is set. The same applies to the CPU 2

At time t6, the CPU 1 and the CPU 2 go into a sleep state. At this time, as a state value, in the master status register 8, indicating the operation status of the CPU 1, a value indicating that the CPU 1 is in an inactive state is set. Also, as a state value, in the master status register 8, indicating the operation status of the CPU 2, a value indicating that the CPU 2 is in an inactive state is set.

Upon detecting the end of processing by the CPU 1 and by the CPU 2, the system controller 7 initiates the bus setting and reassigns the M1 region 14 previously assigned to the CPU 1 to the master circuit 1 and reassigns the M2 region 15 previously assigned to the CPU 2 to the master circuit 2. Thereafter, the M1 region 14 does not process an access from the CPU 1 as an access from the master circuit 1. Also, the M2 region 15 does not process an access from the CPU 2 as an access from the master circuit 2.

In this embodiment, as it is clear from the above descriptions, when a given master circuit goes into an inactive state, the system controller changes the bus setting. Based on this change of the bus setting, the master ID transmitted to the slave circuit is changed. Then, the slave circuit previously assigned to the master circuit that has gone into an inactive state is reassigned to another master circuit. Thereby, the slave circuit previously assigned to the master circuit that has gone into an inactive state is made available to the master circuit to which the slave circuit is now assigned. Accordingly, the use efficiency of system resources is improved.

In addition, the system controller initiates the bus setting and reassigns the slave circuit previously assigned to another circuit to the original master circuit. This prevents the interruption to the primary operation of the semiconductor integrated circuit.

Second Embodiment

Figure 4:
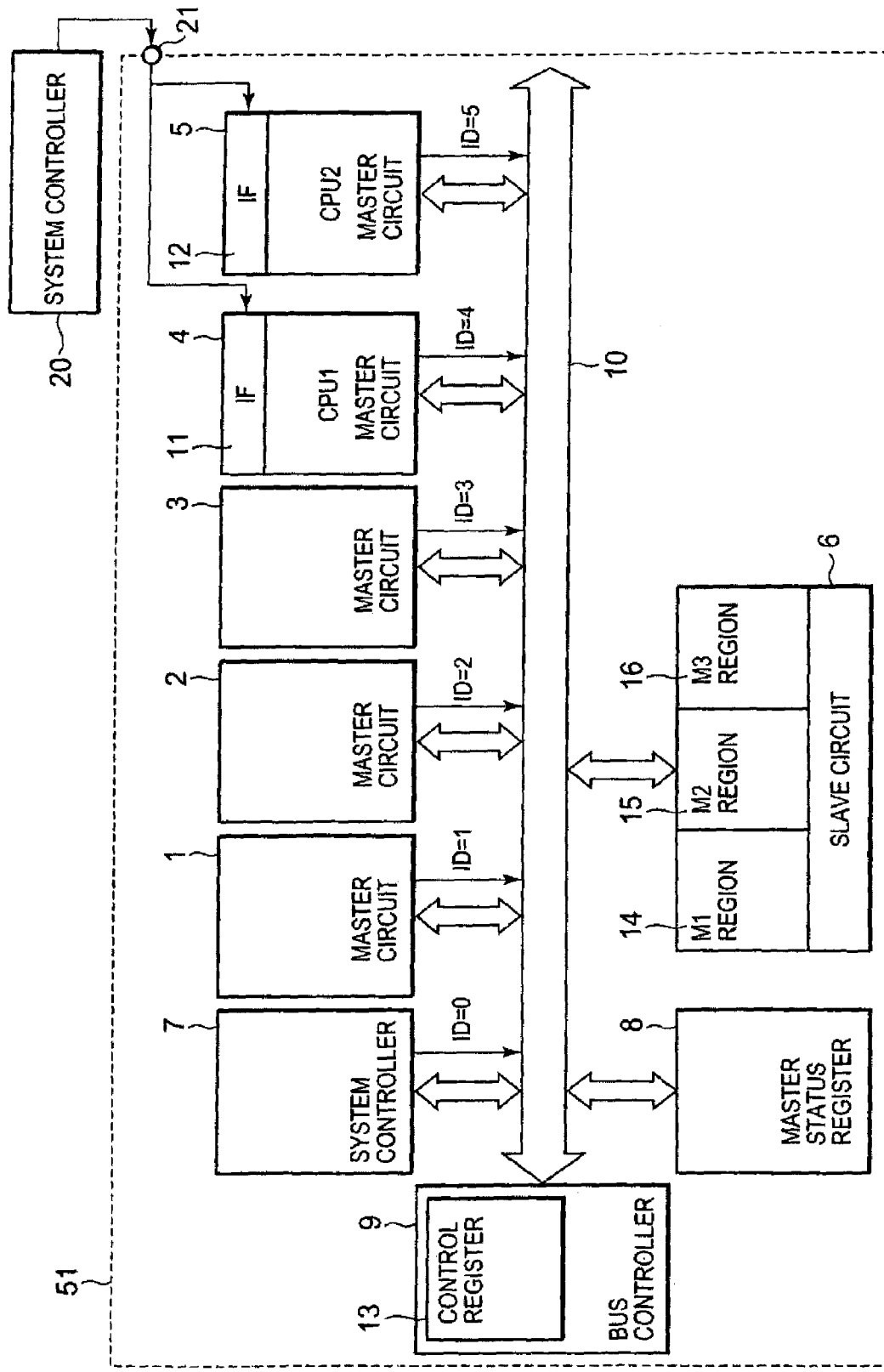
FIG. 4 is a schematic block diagram of a semiconductor integrated circuit 51.

A second embodiment is described hereinafter with reference to FIG. 4. FIG. 4 shows a schematic block diagram of a semiconductor integrated circuit 51.

As shown in FIG. 4, the semiconductor integrated circuit 51 according to this embodiment is different from the semiconductor integrated circuit 50 according to the first embodiment in that the semiconductor integrated circuit 51 includes an external terminal 21 and a system controller 20. The system controller 20 is connected to the interface circuit 11 of the CPU 1 via the external terminal 21. The system controller 20 is connected to the interface circuit 12 of the CPU 2 via the external terminal 21. Here, the system controller 20 is mounted outside a semiconductor chip on which the semiconductor integrated circuit 51 is mounted. Note that the system controller 20 may be monolithically formed with the semiconductor integrated circuit 51.

In this embodiment, the above-mentioned change of bus setting and initiation of bus setting are executed by the CPU 1 and the CPU 2 that are controlled by the system controller 20.

More specifically, the CPU 1, which is started by the system controller 20, monitors the operation statuses of the other master circuits by referring to the master status register 8. If the master circuit is in a sleep state, the CPU 1 changes the bus setting and assigns the M1 region 14 to the CPU 2. This enables the CPU 2, which is started by the system controller 20, to use the M1 region 14. Thereby, the slave circuit previously assigned to the master circuit in an inactive state is made available to the master circuit to which the slave circuit is now assigned. Accordingly, the use efficiency of system resources in the semiconductor integrated circuit 51 is improved.

Upon detecting that the processing by the CPU 2 is ended, the CPU 1, which has been started by the system controller 20, initiates the bus setting and reassigns the M1 region 14 previously assigned to the CPU 2 to the master circuit 1. Thereafter, the slave circuit 6 does not process an access request issued from the CPU 2 as an access request issued from the master circuit 1.

In this embodiment, as it is clear from the above descriptions, change of bus setting and initiation of bus setting are executed by the CPU 1 that is controlled by the system controller 20. That is to say, changing of bus setting and initiation of bus setting do not have to be executed by a system controller inside a semiconductor integrated circuit. In addition, it is possible to assign the M1 region 14 not to the CPU 2 but to the CPU 1 that is controlled by the system controller 20 by adopting an appropriate system configuration. In this case, CPU 1 should be able to access the master register 8 and control register 13 regardless of change of the bus setting.

Third Embodiment

Figure 5:
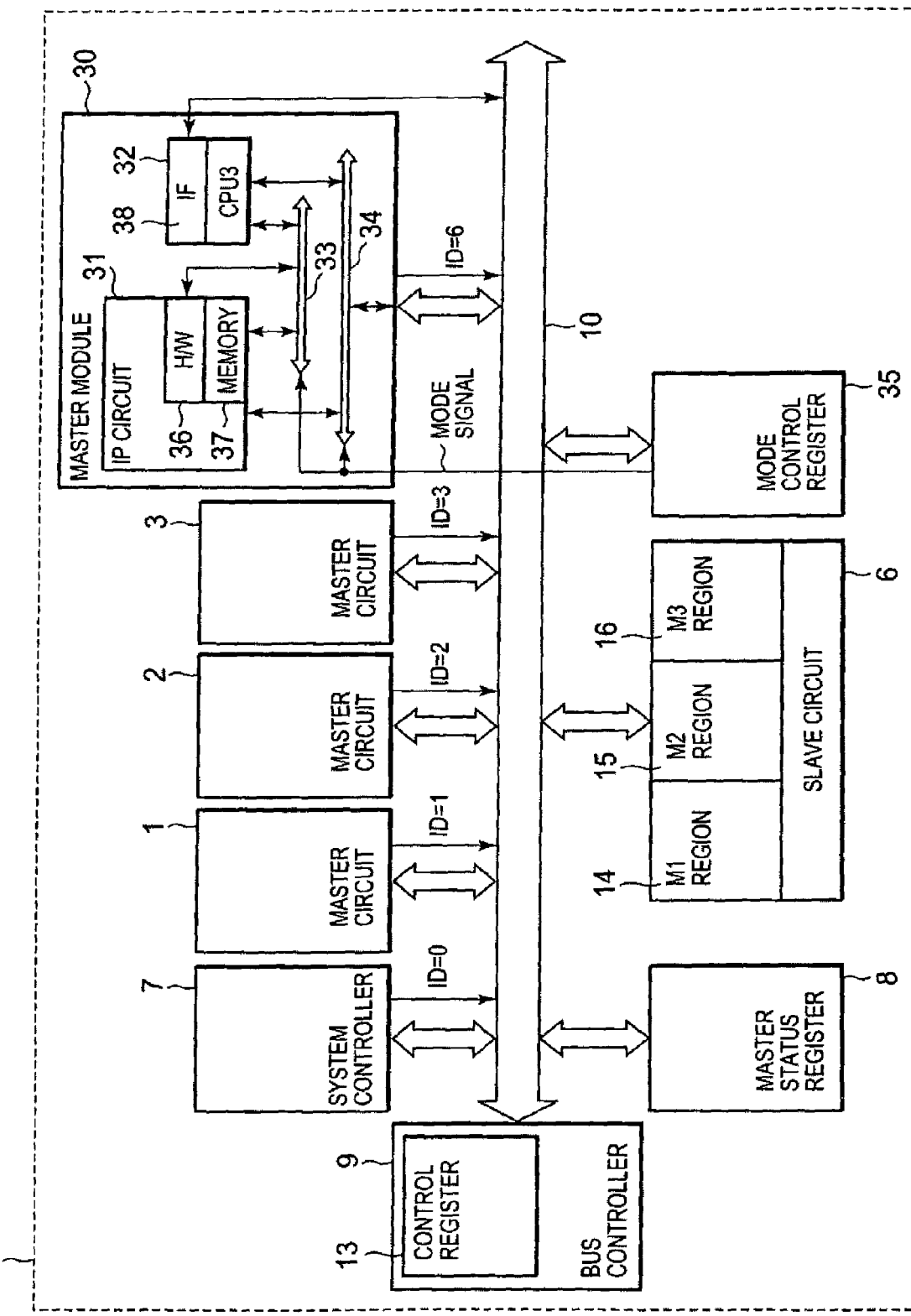
FIG. 5 is a general block diagram of the semiconductor integrated circuit 52.
Figure 6:
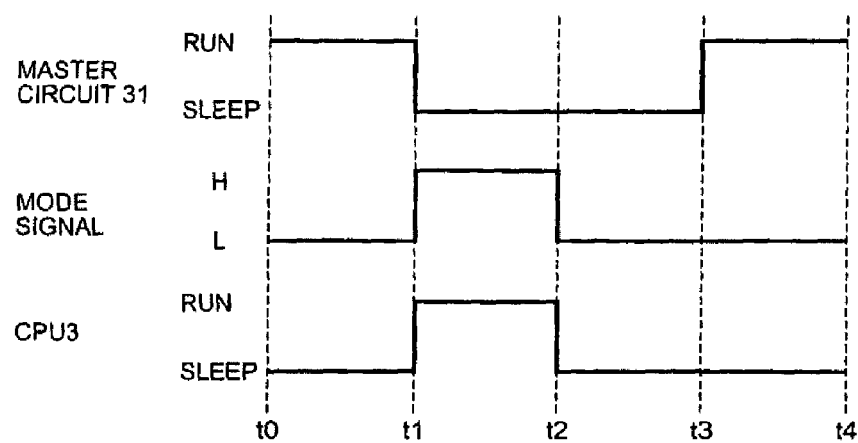
FIG. 6 is a general timing diagram illustrating the operation of a master module.

A third embodiment is described below with reference to FIGS. 5 through 7. FIG. 5 shows a schematic block diagram of a semiconductor integrated circuit 52. FIG. 6 shows a schematic timing diagram illustrating the operation of a master module. FIG. 7 shows a schematic timing diagram illustrating the operation of the semiconductor integrated circuit 52.

The semiconductor integrated circuit 52 according to this embodiment is different from the semiconductor integrated circuit 50 according to the first embodiment in that the semiconductor integrated circuit 52 includes a master module 30 and a mode control register 35. Note that the master circuits 4 and 5 are omitted from the drawings.

The master module 30 is a circuit module including multiple master circuits. The master ID "6" is preset in the master module 30.

The master module 30 includes an IP circuit (functional circuit) 31 and a master circuit 32. The IP circuit 31 is a master circuit that carries out predetermined functions. The master circuit 32 is a small-scale CPU that has smaller circuit size then the IP circuit 31. Hereinafter, the master circuit 32 is occasionally called a CPU 3.

Included inside the IP circuit 31 are a hardware (for example, an ALU: Arithmetic and Logic Unit) 36 and a memory 37. The CPU 3 is able to access the hardware 36 and the memory 37, which are located inside the IP circuit 31, via an interface in the IP circuit 31. The CPU 3 includes an interface circuit (input/output circuit) 38.

The IP circuit 31 is connected to the bus 10 via a bus 34, and the CPU 3 is connected to the bus 10 via the bus 34. The CPU 3 is also connected to a slave circuit (the hardware 36 and the memory 37) inside the IP circuit 31 via a bus 33. An interface circuit 38 of the CPU 3 is connected to the bus 10. The CPU 3 is connected to the system controller 7 via the bus 10.

The mode control register 35 is connected to the system controller 7 via the bus 10. The mode control register 35 holds a predetermined value corresponding to the setting condition of the bus 33 and the bus 34. For example, when the hold value in the mode control register 35 is 1 (level H), the bus 34 is controlled so as to enable the CPU 3 to access the bus 10 and not to enable the IP circuit 31 to access the bus 10. On the other hand, when the hold value in the mode control register 35 is 0 (level L), the bus 34 is controlled so as to enable the IP circuit 31 to access the bus 10 and not to enable the CPU 3 to access the bus 10. That is to say, in response to the change of the hold value in the mode control register 35, the mode control register 35 exclusively (selectively) enables either the IP circuit 31 or the CPU 3 to access the bus 10. In addition, when in an operational state, the CPU 3 is accessible to the slave circuit inside the IP circuit 31 via the bus 33 that is in an active state. Moreover, the mode control register 35 outputs to the buses 33 and 34 a mode signal corresponding to the hold value in the mode control register 35.

Here, the operation of the master module 30 is described with reference to FIG. 6.

At time t0, the IP circuit 31 is in an operational (RUN) state, the mode signal is level L, and the CPU 3 is in a sleep state.

At time t1, the IP circuit 31 goes into a sleep state. At this time, as a state value, in the master status register 8, indicating the operation status of the master module 30, a value indicating that the master module 30 is in an inactive state is set. It is assumed here that the operation statuses of the IP circuit 31 and the master circuit 32 can be determined by referring to the status value indicating the operation status of the master module 30. Needless to say, a status value may be assigned to each of the IP circuit 31 and the master circuit 32.

In response to the change of the status value, the system controller 7 sets the hold value in the mode control register 35 to level H and the mode signal to level H. This enables the CPU 3 to access the slave circuit inside the IP circuit 31 via the bus 33. Additionally, the CPU 3 is enabled to access the bus 10 via the bus 34.

The system controller 7 also starts the CPU 3. Consequently, the master module 30 is set so as to operate independently. In other words, the CPU becomes accessible to the bus 10. Meanwhile, the CPU does not have to be started via the interface circuit 38.

The CPU 3 performs a different function which is not implemented in the IP circuit 31. This makes the master module 30 a multi-functional module. The CPU 3 can use via the bus 33 the slave circuit (the hardware 36 and the memory 37) inside the IP circuit 31 that is in a sleep state. The use efficiency of system resources in the semiconductor integrated circuit 52 improves as the CPU 3 utilizes the slave circuit inside the IP circuit 31.

In addition, to determine the operation status, instead of referring to the status value, of the master status register 8, indicating the operation status of the master module 3, the system controller 7 may directly access the IP circuit 31.

At time t2, the CPU 3 goes into a sleep state. Upon detecting the end of processing by the CPU 3, the system controller 7 initiates the setting of the mode control register 35. That is to say, the system controller 7 puts the hold value in the mode control register back to level L and sets the mode signal back to level L. Accordingly, the master module 30 is set so that the IP circuit 31 can operate independently.

At time t3, the IP circuit 31 goes into an operational state. As a status value, in the master status register 8, indicating the operation status of the master module 30, a value indicating that the master module 30 is in an active state is set.

As mentioned above, in this embodiment, a different function is added to the master module 30 by causing the CPU 3 to function when the IP circuit 31 is not functioning. The use efficiency of system resources in the semiconductor integrated circuit 52 improves as the CPU 3 can utilize the slave circuit (the hardware 36 and the memory 37) inside the IP circuit 31.

Here, the operation of the semiconductor integrated circuit 52 is described with reference to FIG. 7.

When the time is t0, the master circuit 1 is in an operational (RUN) state, the master circuit 2 is in an operational (RUN) state, the master circuit 3 is in an operational (RUN) state, the IP circuit 31 is in an operational (RUN) state, and the mode signal is level L and the CUP 3 is in a sleep state.

At time t1, the master circuit 2 goes into a sleep state, and the master module 30 also goes into a sleep state. At this time, as a state value, in the master status register 8, indicating the operation status of the master circuit 2, a value indicating that the master circuit 2 is in an inactive state is set. The same applies to the master module 30.

The system controller 7 changes the bus setting and reassigns the M2 region 15 previously assigned to the master circuit 2 to the master module 30. This changes the master ID that is transmitted to the slave circuit 6. Specifically, the slave circuit 6 processes an access request issued from the master module 30 as an access request issued from the master circuit 2. That is to say, the M2 region 15 is made available to the master module 30.

After changing the bus setting, the system controller 7 sets the hold value in the mode control register 35 to level H and the mode signal to level H. The system controller 7 also starts the CPU 3. This allows CPU 3 to perform a different function which is not implemented in the IP circuit 31 while the IP circuit 31 is in a sleep state. That is, a multi-functional master module is achieved.

Meanwhile, the slave circuit (the hardware 36 and the memory 37) inside the IP circuit 31 that is in a sleep state is made available to the CPU 3 connected thereto via the bus 33. This improves the use efficiency of system resources in the IP circuit 31. In addition, as is similar to the first embodiment, because the setting of the bus 10 has been changed, the CPU 3 is able to access the M2 region 15 via the bus 10. That is to say, even when the operation status of the master module 30 is altered with the change in the hold value in the mode control register 35, the M2 region 15 can be set in a state in which the M2 region 15 may be useable by the CPU 3. This further improves the use efficiency of system resources in the semiconductor integrated circuit 52.

At time t2, the CPU 3 goes into a sleep state. Upon detecting the end of processing by the CPU 3, the system controller initiates the bus setting and reassigns the M2 region 15 previously assigned to the master module 30 to the master circuit 2. This operation initiates the master ID that is transmitted to the slave circuit 6. Thereafter, an access request issued from the master module 30 is not processed as an access request issued from the master circuit 2.

The system controller 7 also initiates the setting of the mode control register 35. That is to say, the system controller 7 sets the hold value in the mode control register 35 back to level L and the mode signal back to level L. Consequently, the master module 30 is set so that the IP circuit 31 is able to operate independently.

At time t3, the IP circuit 31 goes into an operational state. At this time, as a state value, in the master status register 8, indicating the operation status of the master module 30, a value indicating that the master module 30 is in an active state is set.

According to this embodiment, a multi-functional master module is achieved by using the CPU 3. In addition, when the IP 31 is in an inactive state, the CPU 3 can access the slave circuit (the hardware 36 and the memory 37) in the IP circuit 31 via the bus 33 that is in an active state. Accordingly, the use efficiency of system resources inside the master module 30 is improved.

Like the first and second embodiments, in the semiconductor integrated circuit 52 in this embodiment, when the master circuit 2 goes into an inactive state, the bus setting is changed, and the M2 region 15 previously assigned to the master circuit 2 is reassigned to the master module 30. Then the M2 region 15 is made available to the CPU 3. By this, the slave circuit previously assigned to the master circuit that is in an inactive state becomes available to the CPU 3 as well. Accordingly, the use efficiency of system resources inside the semiconductor integrated circuit 52 is further improved.

It is apparent that the present invention is not limited to the above embodiments, but may be modified and changed without departing from the scope and spirit of the invention.

What is claimed is:

1. A semiconductor integrated circuit, comprising:
 a first master circuit;
 a second master circuit;
 a first slave circuit being assigned to the first master circuit, and determining that an access request signal is sent from the first master circuit when an identification information is a first value;

a first bus being coupled to the first master circuit, the second master circuit, and the first slave circuit;

a bus controller being configured to transmit the access request signal to the first slave circuit via the first bus;

a system controller directing the bus controller to substitute the first value for a second value on the identification information of the access request signal received from the second master circuit when the first master circuit is in the deactivated state, and wherein the bus controller writes the first value on the identification information of the access request signal received from the second master circuit, after receiving the indication from the system controller.

2. The semiconductor integrated circuit according to claim 1, wherein a master identifier transmitted to the first slave circuit via the first bus after changing settings of the first bus is equal to a master identifier pre-set in the first master circuit.

3. The semiconductor integrated circuit according to claim 1, wherein the system controller changes settings of the first bus.

4. The semiconductor integrated circuit according to claim 1, wherein the bus controller is coupled to the first bus, and
wherein the system controller changes settings of the first bus by changing a hold value stored in a register included in the bus controller.

5. The semiconductor integrated circuit according to claim 1, further comprising a master status register that holds a state value indicating an operation status of at least the first master circuit,
wherein the system controller changes settings of the first bus when the state value indicates that the first master circuit is in an inactive state.

6. The semiconductor integrated circuit according to claim 1, wherein the system controller controls a stop and start of at least the first master circuit and the second master circuit.

7. The semiconductor integrated circuit according to claim 1, wherein the system controller starts the second master circuit when a state value in the master status register indicates that the first master circuit is in an inactive state.

8. The semiconductor integrated circuit according to claim 1, wherein the system controller is coupled to an interface circuit of the second master circuit via the first bus.

9. The semiconductor integrated circuit according to claim 1, further comprising a third master circuit including an interface circuit to which the system controller is coupled,
wherein the system controller changes said settings of the first bus by utilizing the third master circuit.

10. The semiconductor integrated circuit according to claim 9, wherein the system controller is coupled to said interface circuit of said third master circuit via an external terminal,
wherein the first slave circuit, previously assigned to the first master circuit, reassigned to at least one of the second master circuits when the operational status of the first master circuit is inactive, the first slave circuit is accessible by the first master circuit and the at least one of the second master circuits.

11. The semiconductor integrated circuit according to claim 1, further comprising a second bus coupled to the first master circuit and the second master circuit.

12. The semiconductor integrated circuit according to claim 11, further comprising a third bus coupled to the second master circuit and the first slave circuit.

13. The semiconductor integrated circuit according to claim 12, wherein the system controller controls settings of at least the second bus.

14. The semiconductor integrated circuit according to claim 12, wherein the system controller changes settings of the second bus based on a change of a hold value in a mode control register coupled to the second bus.

15. The semiconductor integrated circuit according to claim 1, wherein the first master circuit and the second master circuit are incorporated in a master module coupled to a first bus.

16. The semiconductor integrated circuit according to claim 1, further comprising:
a third master circuit; and
a second slave circuit that is assigned to the third master circuit,
wherein the third master circuit and the second slave circuit are further coupled to the first bus, and
wherein said second slave circuit is reassigned to the master module based on an operational status of the third master circuit.

17. A method for controlling a semiconductor integrated circuit including a first master circuit, a second master circuit, and a first slave circuit, the method comprising:
determining, by a first slave circuit being assigned to the first master circuit, that an access request signal is sent from the first master circuit when an identification information is a first value,
wherein a first bus is coupled to the first master circuit, the second master circuit, and the first slave circuit;
transmitting, by a bus controller, the access request signal to the first slave circuit via the first bus;
directing, by a system controller, the bus controller to substitute the first value for a second value on the identification information of the access request signal received from the second master circuit when the first master circuit is in the deactivated state; and
writing, by the bus controller, the first value on the identification information of the access request signal received from the second master circuit, after receiving the indication from the system controller.

18. The method according to claim 17, wherein any one of the first master circuit and the second master circuit is enabled to access the first bus based on a change of settings of a second bus that is coupled to the first master circuit and the second master circuit.

19. The method according to claim 17, further comprising of changing settings of the first bus by changing a hold value stored in a register included in the bus controller.

20. The method according to claim 17, further comprising:
holding, by a master status register, a state value indicating an operation status of at least the first master circuit; and
changing, by a system controller, settings of the first bus when the state value indicates that the first master circuit is in an inactive state.

* * * * *